US011714729B1

(12) United States Patent
Totappanavar et al.

(10) Patent No.: US 11,714,729 B1
(45) Date of Patent: Aug. 1, 2023

(54) HIGHLY AVAILABLE AND SCALABLE TELEGRAF BASED APPLICATION MONITORING

(71) Applicant: VMWARE, INC., Palo Alto, CA (US)

(72) Inventors: Vineeth Totappanavar, Bangalore (IN); Venkata Padma Kaki, West Godavari (IN); Vinothkumar D, Villupuram (IN); Rahul Singh, Benares (IN); Aswathy Ramabhadran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/672,723

(22) Filed: Feb. 16, 2022

(30) Foreign Application Priority Data

Dec. 21, 2021 (IN) .............................. 202141059643

(51) Int. Cl.
*G06F 11/00* (2006.01)
*G06F 11/20* (2006.01)

(52) U.S. Cl.
CPC ...... *G06F 11/2025* (2013.01); *G06F 11/2041* (2013.01); *G06F 2201/865* (2013.01)

(58) Field of Classification Search
CPC ............. G06F 11/2025; G06F 11/2041; G06F 11/2023–2051
See application file for complete search history.

(56) References Cited

U.S. PATENT DOCUMENTS

| 8,850,528 | B2 | 9/2014 | Van Biljon et al. |
| 8,977,679 | B2 | 3/2015 | Van et al. |
| 9,032,069 | B2 | 5/2015 | Van Biljon et al. |
| 10,592,350 | B2 | 3/2020 | Dornemann |
| 11,175,964 | B2 | 11/2021 | Jaeger et al. |
| 2005/0172161 | A1* | 8/2005 | Cruz ................... G06F 11/2025 714/4.11 |
| 2006/0015618 | A1* | 1/2006 | Freimuth ................ H04L 49/90 711/E12.057 |
| 2012/0117229 | A1 | 5/2012 | Van et al. |
| 2013/0060839 | A1 | 3/2013 | Van et al. |

(Continued)

OTHER PUBLICATIONS

Ellingwood, "How to Set Up Highly Available HAProxy Servers with Keepallived and Reserved IPs on Ubuntu 14.04", Oct. 23, 2015 (Year: 2015).*

(Continued)

*Primary Examiner* — Michael Maskulinski

(57) ABSTRACT

A Highly Available system utilizes at least one host fit to send data, and a primary server fit to receive data. The primary server comprises, a failover server capable of communicating with a http server and able to receive data from the host, and where the http server can receive data from the failover server, and an adapter capable of receiving data from the http server for processing. The Highly Available system also utilizes at least one secondary server fit to receive data from the host, and further fit to process data on failure of primary server or its components. The secondary server comprises a second failover server capable of communicating with a second http server and able to receive data from the host, and where the second http server can receive data from the second failover server, and an adapter capable of receiving data from the second http server for processing.

24 Claims, 2 Drawing Sheets

(56) References Cited

U.S. PATENT DOCUMENTS

| | | |
|---|---|---|
| 2015/0295800 A1 | 10/2015 | Bala et al. |
| 2016/0366142 A1 | 12/2016 | Kamble |
| 2017/0262347 A1 | 9/2017 | Dornemann |
| 2018/0191718 A1 | 7/2018 | Kuzkin et al. |
| 2019/0190771 A1 | 6/2019 | Fang |
| 2020/0250009 A1 | 8/2020 | Jaeger et al. |
| 2021/0397522 A1* | 12/2021 | Owen .................. G06F 16/128 |

OTHER PUBLICATIONS

Ramirez, "How to Run HAProxy with Docker", Aug. 9, 2021 (Year: 2021).*
"Getting Started with Containers", Red Hat Enterprise Linux Atomic Host 7, Red Hat, Jun. 6, 2020 (Year: 2020).*
Shetti, Application Status Collection in Kubernetes via Telegraf Sidecars and Wavefront, Aug. 8, 2018, 14 pgs.

\* cited by examiner

HIGHLY AVAILABLE AND SCALABLE TELEGRAF BASED APPLICATION MONITORING

RELATED APPLICATION

Benefit is claimed under 35 U.S.C. 119(a)-(d) to Foreign Application Serial No. 202141059643 filed in India entitled "HIGHLY AVAILABLE AND SCALABLE TELEGRAF BASED APPLICATION MONITORING", on Dec. 21, 2021, by VMware, Inc., which is herein incorporated in its entirety by reference for all purposes.

BACKGROUND ART

In order to monitor numerous virtual machines at once, VMware has developed systems for application monitoring and metric analysis in order to assist an end user in understanding the state of their applications. Prior solutions were functional but had the drawback of a hard limit on the number of applications that could be monitored at once. Should the end user exceed that number, they would have to pick and choose which applications to prioritize in monitoring and analyzing.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
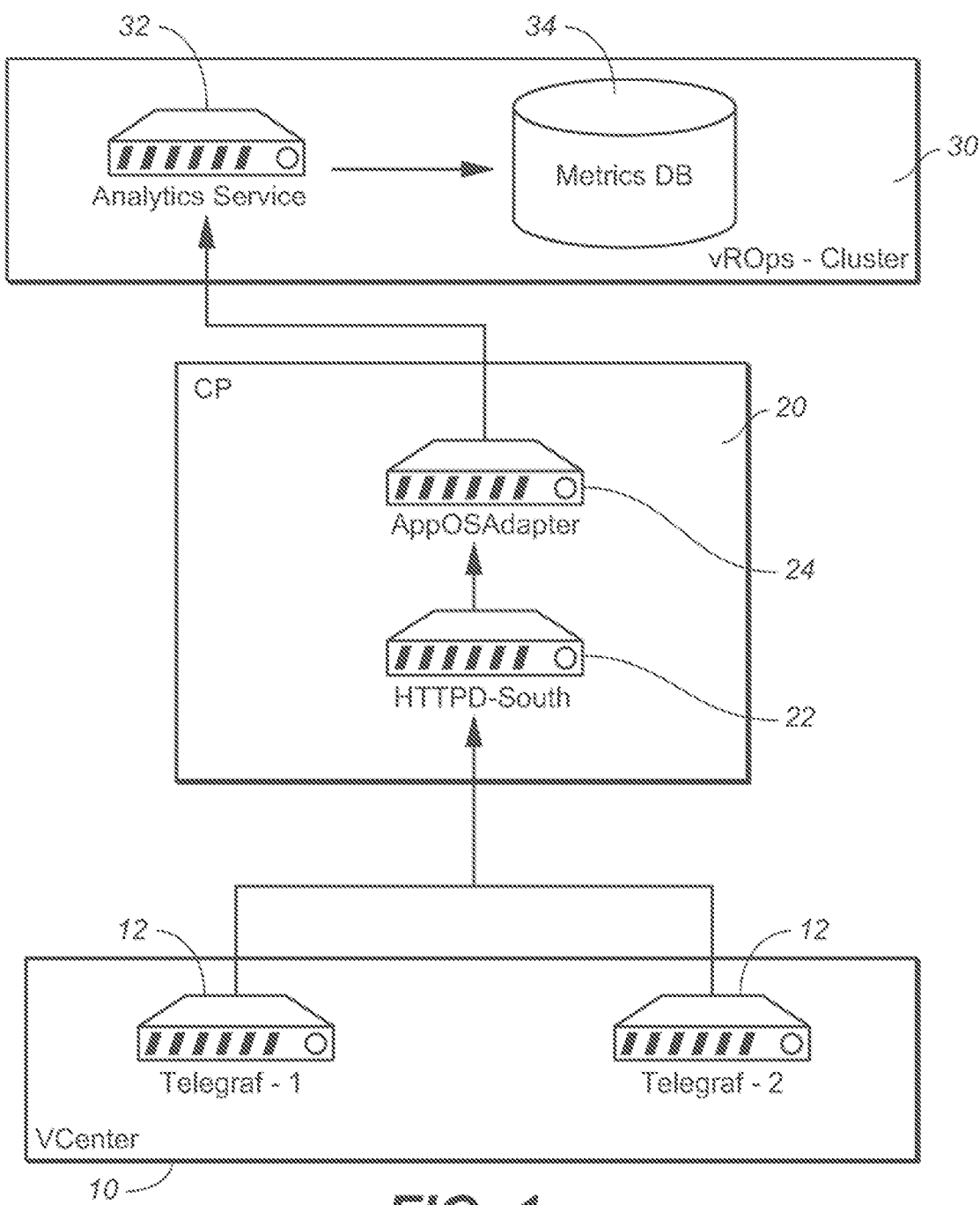
FIG. 1 is a data plane metric flow diagram of the existing application monitoring system

Metrics allow an end user to have insight on the state, behavior, value, or changes of a particular system or subsystem that is recognized by the metric name. There are many components that generate metrics, and there are different systems and tools that may receive the metrics and visually display them in a graphical format for better understanding on the user's part.

vROps is a monitoring solution built on top of vSphere such that it may use vSphere to pull out the underlying information related to the inventory (which vSphere maintains). vROps is capable of application monitoring things such as cloud storage, a users storage network, and many other things. vROps may also build additional capabilities.

vROps based Application Monitoring solution consumes the metric data generated by Telegraf and gives insight to the user about the status of their application. This system allows a user to monitor their Applications state and can take preventive actions when required. This ability to take preventative action could assist in avoiding downtime of critical Applications that perform day to day activities.

Current vROps based application monitoring is not a highly available solution, meaning there are multiple components in the data path between Telegraf and vROps that could be a point of failure. The current design can also only support up to a maximum of 3000 virtual machines from a VCenter. If a customer has a VCenter with more than 3000 hosts, they would be forced to choose only the most important machines hosting their applications for monitoring or even restrict the monitored virtual machines to 3000 hosts.

vROps is dependent on many adapters for processing data from application monitoring. AppOSAdapter is one such adapter, and is responsible for the processing of application related data that is pushed from the underlying infrastructure (e.g. telegraph). After AppOSAdapter processes the metrics it is given, AppOSAdapter will pass on the data to vROps. There are similar adapters in vROps such as the VCenter.

AppOSAdapter is an adapter based component of vROps and runs part of a Collector Service in the Cloud Proxy. This component currently has a one-to-one relation with the configured VCenter in vROps, meaning there could be only one AppOSAdapter created in a Cloud Proxy for any given VCenter. This point acts as a bottleneck which restricts scaling the system out horizontally, which would allow for more hosts to be monitored. The first step in the process of making the system horizontally scalable is to make the AppOSAdapter stateless so it can be installed on multiple Collectors. Having multiple instances of AppOSAdapter creates redundant components which would assist in making a high availability setup.

A high availability setup for application monitoring will be created using KeepaliveD, which provides a floating or virtual IP. Load balancing is achieved through HAProxy. KeepaliveD switches the virtual IP to the next available backup node upon failure of HAProxy or itself. Meanwhile HAProxy takes care of any failure that occurs with HTTPD-South or with AppOSAdapter running part of the collector service. In this way all the components (AppOSAdapter, HTTPD-South, HAProxy and KeepaliveD) involved in the data path can be made resilient to failures. HTTPD-South is a HTTPD server that is responsible for accepting all the metrics from the south point applications such as telegraph.

With reference now to FIG. 1, a Data plane metric flow diagram of the pre-existing application monitoring system can be seen. In this schematic that shows the application monitoring flow, it can be seen that there is a VCenter 10 containing multiple instances of Telegraf 12, a single Cloud Proxy 20 that contains an AppOSAdapter 24 and a HTTPD-South 22, and a vROps Cluster 30 that contains an Analytics Service 32 and Metrics DB 34. The main issue with this design is within the Cloud Proxy 20, and the single instances of AppOSAdapter 24 and a HTTPD-South 22. Should either of AppOSAdapter 24 and a HTTPD-South 22 fail, the whole system would be paralyzed. As such, AppOSAdapter 24 and a HTTPD-South 22 are two potential single points of failure.

Figure 2:
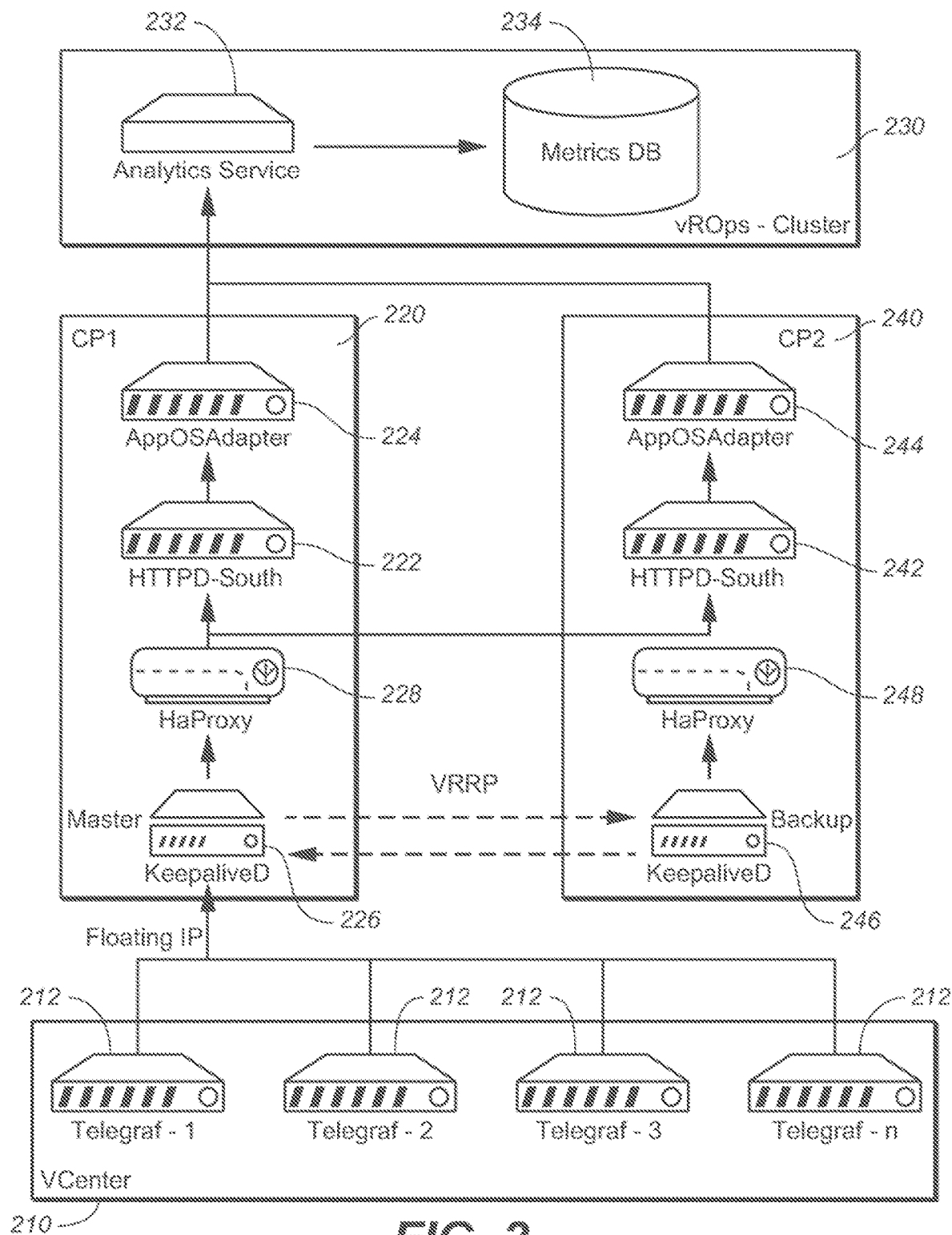
FIG. 2 is a data plane metric flow diagram of the proposed application monitoring system

FIG. 2 shows a Data plane metric flow diagram of the proposed application monitoring system as described in the current embodiment. In this embodiment, there is a VCenter 210 with one or more instances of Telegraf 212, which each may run multiple applications. The present embodiment also includes a receiving vROps Cluster 230, within which an Analytics Service 232 and Metrics DB 234 are included. The last portion of this embodiment are a first Cloud Proxy 220 and a second Cloud Proxy 240. The first Cloud Proxy 220 includes: a KeepaliveD 226, a HAProxy 228, a HTTPD-South 222, and an AppOSAdapter 224. Similarly, the second Cloud Proxy 240 includes: a second KeepaliveD 246, a HAProxy 248, a HTTPD-South 242, and an AppOSAdapter 244.

While two cloud proxies are shown in this embodiment, it should be appreciated that this design allows for more cloud proxies to be added according to the end user's needs. The cloud proxies act as an intermediary component. The ability of the end user to add on more cloud proxies allows the user to horizontally scale their setup to allow for as few or as many applications to be run and tracked as they require.

In the current embodiment, the one or more cloud proxies such as 220 and 240 may be added to a collector group. The collector group is a virtual entity or a wrapper on top of the cloud proxies 220 and 240 made to group them. With this embodiment, the multiple cloud proxies would offer alternative routes such that the failure of the services in the data plane would be less likely.

KeepaliveD 226 serves the purpose of exposing a virtual IP to the downstream endpoint nodes. In this embodiment Telegraf 212, the application metric collection service, would send the collected metric data to the Cloud Proxy 220 by utilizing KeepaliveD 226 and the virtual IP. Along with pushing the metric data from Telegraf 212 through the virtual IP, KeepaliveD 226 also communicates with second KeepaliveD 246 from the second Cloud Proxy 240. Through this communication, KeepaliveD 226 and second KeepaliveD 246 work in a master—backup format with KeepaliveD 226 as the master and second KeepaliveD 246 as the backup. Should any part of Cloud Proxy 220 fail, whether it be KeepaliveD 226 or an upstream component such as HAProxy 228, then KeepaliveD 226 will shift the virtual IP to the next available Cloud Proxy (in this case second Cloud Proxy 240). It should be appreciated that any other cloud proxies attached to the system may be included in the master—backup format and could potentially take on the equivalent master roll in case of the original master failing.

HAProxy 228 serves to preform load balancing actions, as well as handle any failures upstream of itself. More specifically, as HAProxy 228 receives metric data from KeepaliveD 226 it will then distribute the metric data to the available HTTPD-South instances (in the described embodiment the HTTPD-South instances would be 222 and 242, but it should be appreciated that more may be added at the user's discretion as more cloud proxies are added).

In this embodiment, a round robin distribution method is used by the HAProxy. By distributing the metric data with HAProxy 228 to the available HTTPD-South server instances 222 and 242, all the metric data received from Telegraf 212 would be equally distributed among the available AppOSAdapter instances 224 and 244 for processing. With this method, the system is horizontally scalable for the purpose of Application Monitoring.

Should HTTPD-South 222 or AppOSAdapter 224 fail, HAProxy 228 would then engage in its second function of rerouting requests to the next available HTTPD-South server instance (242).

In this embodiment, AppOSAdapter 224 is a part of Cloud Proxy 220 (and AppOSAdapter 244 a part of second Cloud Proxy 240). This setup allows for multiple instances for a AppOSAdapter 224 to handle any failure. Each instance of AppOSAdapter (224, 244) will also have the VCenter 210 information to which it would be attached.

Due to the load balancing method that HAProxy 228 uses, metric data could arrive on any instance of AppOSAdapter (224, 244) running as part of the collector group. As a result, AppOSAdapter 224 and 244 need to be stateless to handle such metric data. Cache within AppOSAdapter 224 and 244 maintains information about the metrics related to the object it has processed for 5 consecutive collection cycles. In the case that there is no metric for an object processed by AppOSAdapter (224 for example), it is marked as "Data not Receiving". This label could create confusion for the person who is viewing this specific object as the metrics are still being received, but by a new AppOSAdapter (244 in this example). The same issue would show up while showing the errored object. We ended up showing as Collecting as we collect one metric related to the availability of the object as unavailable. But with respect to the object, there is still a metric being processed.

To reduce confusion, the current embodiment may employ a priority based list of status. All statuses of "error" would have the highest display priority followed by all the "collecting" statuses. All others would have subsequent priority. Using this priority list, the objects of interest may be displayed in terms of highest to lowest priority for ease of the user. It should be appreciated that other display methods such as lowest to highest priority, a user dictated arrangement, or similar arrangements may also be utilized.

What is claimed is:

1. A Highly Available system comprising:
   at least one host fit to send data;
   a primary server fit to receive data, said primary server comprising:
     a failover server capable of communicating with a http server and receive data from said host;
     said http server capable of receiving data from said failover server;
     an adapter capable of receiving data from said http server for processing; and
   at least one secondary server fit to receive data from said host, and further fit to process data on failure of primary server or its components, said secondary server comprising:
     a second failover server capable of communicating with a second http server and receive data from said host;
     said second http server capable of receiving data from said second failover server; and
     an adapter capable of receiving data from said second http server for processing.

2. A Load Distribution system comprising:
   at least one host fit to send data;
   a primary server fit to receive data, said primary server comprising:
     a failover server capable of communicating with a distribution server and receive data from said host;
     said distribution server capable of receiving data from said failover server and distributing data among at least one http server;
     said http server capable of receiving data from said distribution server;
     an adapter capable of receiving data from said http server for processing; and
   at least one secondary server fit to receive data from said host, and further fit to process data on failure of said primary server or its components, said secondary server comprising:
     a second failover server capable of communicating with a second distribution server and receive data from said host;
     said distribution server capable of receiving data from said second failover server and distributing data among at least one second http server;
     said second http server capable of receiving data from said second failover server;
     an adapter capable of receiving data from said second http server for processing.

3. A highly available system comprising:
   at least one server fit to send data;
   a cloud based proxy fit to receive data;

at least one proxy fit to receive data from said server, and further fit to send data at least to said cloud based proxy, said proxy comprising:
a master server;
a sub proxy;
a message receiver;
an adapter; and
at least one secondary proxy fit to receive data from said server or said proxy, and further fit to send data at least to said cloud based proxy, said secondary proxy comprising:
a backup server capable of communicating with said master server;
a second sub proxy;
a second message receiver capable of receiving data from said sub proxy; and
a second adapter.

4. The highly available system of claim 3 wherein, said backup server communicates with said server.

5. The highly available system of claim 3 wherein, said secondary proxy acts in place of said proxy in the event that said proxy fails.

6. The highly available system of claim 3 wherein, said backup server maintains the information of said master server, even while said master server is functioning properly.

7. The highly available system of claim 3 wherein, said secondary proxy acts in parallel to said proxy.

8. The highly available system of claim 3 wherein, any number of said secondary proxies can be placed in parallel to said proxy.

9. The highly available system of claim 3 wherein, said highly available system is horizontally scalable.

10. The highly available system of claim 3 wherein, said adapter is stateless.

11. The highly available system of claim 3 wherein, said adapter creates a priority based list of said data, and further labels said data as either collecting or error, wherein said data given an error label are high on said priority based list.

12. A load distribution system comprising:
at least one server fit to send data;
a cloud based proxy fit to receive data;
at least one proxy fit to receive data from said server, and further fit to send data at least to said cloud based proxy, said proxy comprising:
a master server;
a sub proxy capable of equally distributing data to multiple receptors;
a message receiver;
an adapter; and
at least one secondary proxy fit to receive data from said server or said proxy, and further fit to send data at least to said cloud based proxy, said secondary proxy comprising:
a backup server capable of communicating with said master server;
a second sub proxy capable of distributing data to multiple receptors;
a second message receiver capable of receiving data from said sub proxy; and
a second adapter.

13. The load distribution system of claim 12 wherein, said sub proxy uses a round robin distribution method to send data to said message receiver, said second message receiver, and any further coupled instances of said message receiver.

14. The load distribution system of claim 12 wherein, said second sub proxy takes over the distribution role of said sub proxy.

15. The load distribution system of claim 12 wherein, said backup server and said second sub proxy are on standby until failure of at least one of said master server and said sub proxy.

16. A highly available and load distribution system comprising:
At least one server fit to send data;
A cloud based proxy fit to receive data;
At least one proxy fit to receive data from said server, and further fit to send data at least to said cloud based proxy, said proxy comprising:
a master server;
a sub proxy capable of equally distributing data to multiple receptors;
a message receiver;
an adapter; and
at least one secondary proxy fit to receive data from said server or said proxy, and further fit to send data at least to said cloud based proxy, said secondary proxy comprising:
a backup server capable of communicating with said master server;
a second sub proxy capable of distributing data to multiple receptors;
a second message receiver capable of receiving data from said sub proxy; and
a second adapter.

17. The highly available and load distribution system of claim 16 wherein, said backup server communicates with said server.

18. The highly available and load distribution system of claim 16 wherein, said secondary proxy acts in place of said proxy in the event that said proxy fails.

19. The highly available and load distribution system of claim 16 wherein, said backup server maintains the information of said master server, even while said master server is functioning properly.

20. The highly available and load distribution system of claim 16 wherein, said secondary proxy acts in parallel to said proxy.

21. The highly available and load distribution system of claim 16 wherein, any number of said secondary proxies can be placed in parallel to said proxy.

22. The highly available and load distribution system of claim 16 wherein, said sub proxy uses a round robin distribution method to send data to said message receiver, said second message receiver, and any further coupled instances of said message receiver.

23. The highly available and load distribution system of claim 16 wherein, said second sub proxy takes over the distribution role of said sub proxy.

24. The highly available and load distribution system of claim 16 wherein, said backup server and said second sub proxy are on standby until failure of at least one of said master server and said sub proxy.

* * * * *